United States Patent
Beach

[15] 3,703,132
[45] Nov. 21, 1972

[54] ELECTRIC GENERATOR DRIVE MECHANISM

[72] Inventor: David E. Beach, Penfield, N.Y.

[73] Assignee: Eastman Kodak Company, Rochester, N.Y.

[22] Filed: Sept. 29, 1969

[21] Appl. No.: 861,916

[52] U.S. Cl.................................................95/11.5
[51] Int. Cl..............................................G03b 9/70
[58] Field of Search................................95/11, 11.5

[56] References Cited

UNITED STATES PATENTS

| | | | |
|---|---|---|---|
| 2,490,225 | 12/1949 | McGall | 95/11.5 |
| 2,542,164 | 2/1951 | Tatro | 95/11.5 |
| 2,976,398 | 3/1961 | McKee | 240/1.3 |
| 3,063,352 | 11/1962 | Engelsmann | 95/10 C |
| 3,211,069 | 10/1965 | Rixton | 95/11.5 |
| 2,328,831 | 9/1943 | Mendelsohn | 95/11.5 |
| 2,972,937 | 2/1961 | Suits | 95/11.5 |
| 2,576,934 | 12/1951 | Grier | 95/11.5 X |
| 2,299,497 | 10/1942 | Rosenthal | 95/11.5 |

Primary Examiner—John M. Horan
Attorney—Robert W. Hampton and Milton S. Sales

[57] ABSTRACT

Device for driving the rotor of an electric generator which includes a spring biased drive member operatively connected to the generator rotor. The biasing spring is normally not effective to bias the drive member and is rendered effective during the process of setting the drive members in motion. The output of the generator may supply power to a camera flash lamp circuit and/or exposure control mechanism.

5 Claims, 2 Drawing Figures

PATENTED NOV 21 1972 3,703,132

DAVID E. BEACH
INVENTOR.

BY Milton S. Sales
Robert W. Hampton
ATTORNEYS

ELECTRIC GENERATOR DRIVE MECHANISM

CROSS-REFERENCE TO RELATED APPLICATIONS

Reference is made to my commonly assigned copending U.S. Patent Application Ser. No. 861,942, now U.S. Pat. No. 3,598,030 entitled ELECTRIC GENERATOR DRIVE MECHANISM, filed concurrently herewith.

BACKGROUND OF THE INVENTION

1. Field of the Invention

This invention relates to drive mechanisms for electric generators and is particularly but not exclusively suited for use with generators of the type used in photographic apparatus such as cameras.

2. Description of the Prior Art

Photographic apparatus such as cameras that employ electric generators are known in the art. Such apparatus commonly employ a spring biased driving member to rapidly rotate the generator armature. It is further known to set the drive spring in its force applying state by a mechanism such as the film advancing linkage or a manually operated crank. Once the spring is set in its force applying state, the member is set in motion by releasing a latch, permitting the armature-driving device to move rapidly under the influence of the spring. After the generator has supplied sufficient power to operate a flash lamp, the camera shutter is automatically released. Such devices are shown in U.S. Pat. No. 2,322,067 to Ernest V. Soreny entitled FLASHLIGHT SYNCHRONIZING DEVICE and published German Application No. 1,149,607 to Hans Wiener et al.

Where the spring for biasing the generator drive member is set in its force applying state by film winding apparatus, the return stroke of the shutter release lever, etc., certain problems arise. For instance, reliance on the film winding mechanism to reset the system would preclude intentional double exposures. If the return stroke of the shutter release lever were relied upon to reset the system, the shutter release return spring would necessarily have a large spring constant requiring considerable force to activate the camera. This is aggravated by the fact that the point of greatest resistance to "resetting" would be reached when the release lever return spring was substantially fully extended.

SUMMARY OF THE INVENTION

It is an object of the present invention to provide an improved mechanism for driving an electric generator by a spring biased member wherein the drive spring is set to a force applying state during movement of a device movable for setting the member in motion.

In accordance with a preferred embodiment of the invention, a movably mounted generator drive sector or member has gear teeth which mesh with a pinion fixed to a generator armature. The drive member is powered by a spring which is set to a force applying state during the unlatching operation of the drive member, whereupon the drive member moves through a path to drive the generator. The movement of the drive member causes the closing of a switch in the flash lamp circuit, the setting of an exposure control mechanism and/or the tripping of the shutter drive mechanism.

The invention, and its objects and advantages will become more apparent in the detailed description of the preferred embodiments described below.

BRIEF DESCRIPTION OF THE DRAWING

In the detailed description of the preferred embodiments of the invention presented below, reference is made to the accompanying drawings, in which.

THE PREFERRED EMBODIMENT OF THE INVENTION

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
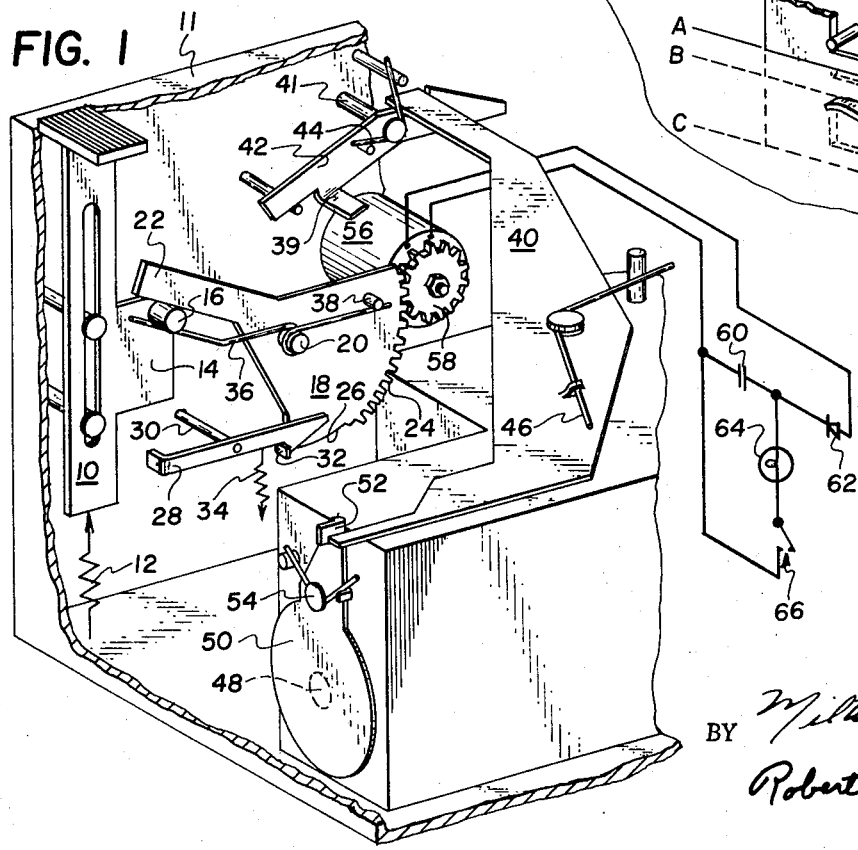
FIG. 1 is a schematic view of one embodiment of the present invention.

Referring to FIG. 1, there is shown a camera flash system in which the electrical power to ignite the flash lamp is supplied by a generator which is driven by a mechanical linkage system associated with the shutter release mechanism.

A shutter release member comprising a slide or lever 10 is mounted in a camera casing 11 for vertical movement. A spring 12 biases slide 10 towards its raised position. A lug 14 extends from slide 10 and carries a post 16.

A generator drive sector 18 is mounted for rotation about a pivot 20 adjacent release slide 10. A leg 22 carried by drive sector 18 extends toward slide 10 above post 16. The drive sector is provided with an arcuate edge having gear teeth 24 extending along a portion thereof and a void 26 along a second portion.

A latch member 28 is rotatably carried by pivot 30 for cooperation with a lug 32 on drive sector 18 and is biased for rotation in a clockwise direction by spring 34. A spring 36 is carried by pivot 20 and abuts post 16 at one end and a post 38 on drive sector 18 at the other.

Drive sector 18 is positioned to engage a lug 39 on a pivotally mounted latch 42 which is normally biased for rotation in a counterclockwise direction about a pivot 41 by a spring 44. In the position shown in FIG. 1, latch 42 normally holds a shutter drive lever 40 to the left against the bias of a spring 46.

The camera lens 48 is provided with a conventional shutter mechanism 50 which carries a projection 52 lying in the path of shutter drive lever 40. The shutter mechanism is pivotally mounted on the camera housing at 54.

A generator 56 having a movable part or rotor such as an armature, not shown and a stator, carries a pinion 58 which is positioned to cooperate with gear teeth 24 on drive sector 18. A capacitor 60 is connected over the windings of generator 56 and is electrically charged when the armature is rotated by sector 18. A diode 62 is provided to prevent the capacitor from discharging through the generator winding. A flash attachment having a bulb 64 is connected in parallel with capacitor 60, the electrical connection including a switch 66 in the flash attachment circuit and positioned adjacent shutter 50 to be closed when the shutter is opened. An exposure control circuit may also be powered by generator 56 as disclosed in my copending application Ser. No. 861,942, filed concurrently herewith.

In operation, spring 36 is only slightly tensioned when release slide 10 is in its raised position. As the slide is depressed, post 16 moves downwardly to tension spring 36. As this is happening, latch member 28 prevents movement of generator drive sector 18. When release slide 10 has been depressed to a point in which lug 14 makes contact with latch member 28, further depression of the slide will pivot the latch member in a counterclockwise direction to release drive sector 18 for counterclockwise rotation induced by spring 36. Rotation of drive sector 18 drives generator 56 through gear teeth 24 and pinion 58. Void 26 on drive sector 18 permits continued rotation of pinion 58 under the influence of the momentum of the armature for a limited time after full travel of the drive sector. When generator drive sector 18 approaches its end of travel, it abuts latch 42 to release shutter drive lever 40. Rightward travel of lever 40 opens shutter 50 and closes switch 66 to fire flash lamp 64 by discharging capacitor 60.

To return the mechanism to its cocked position, the operator releases slide 10 which is then raised by spring 12. Post 16 in cooperation with leg 22 rotates drive sector 18 in a clockwise direction until it is latched by member 28. Shutter drive member 40 may be returned to the position illustrated by conventional cocking means, not shown.

Figure 2:
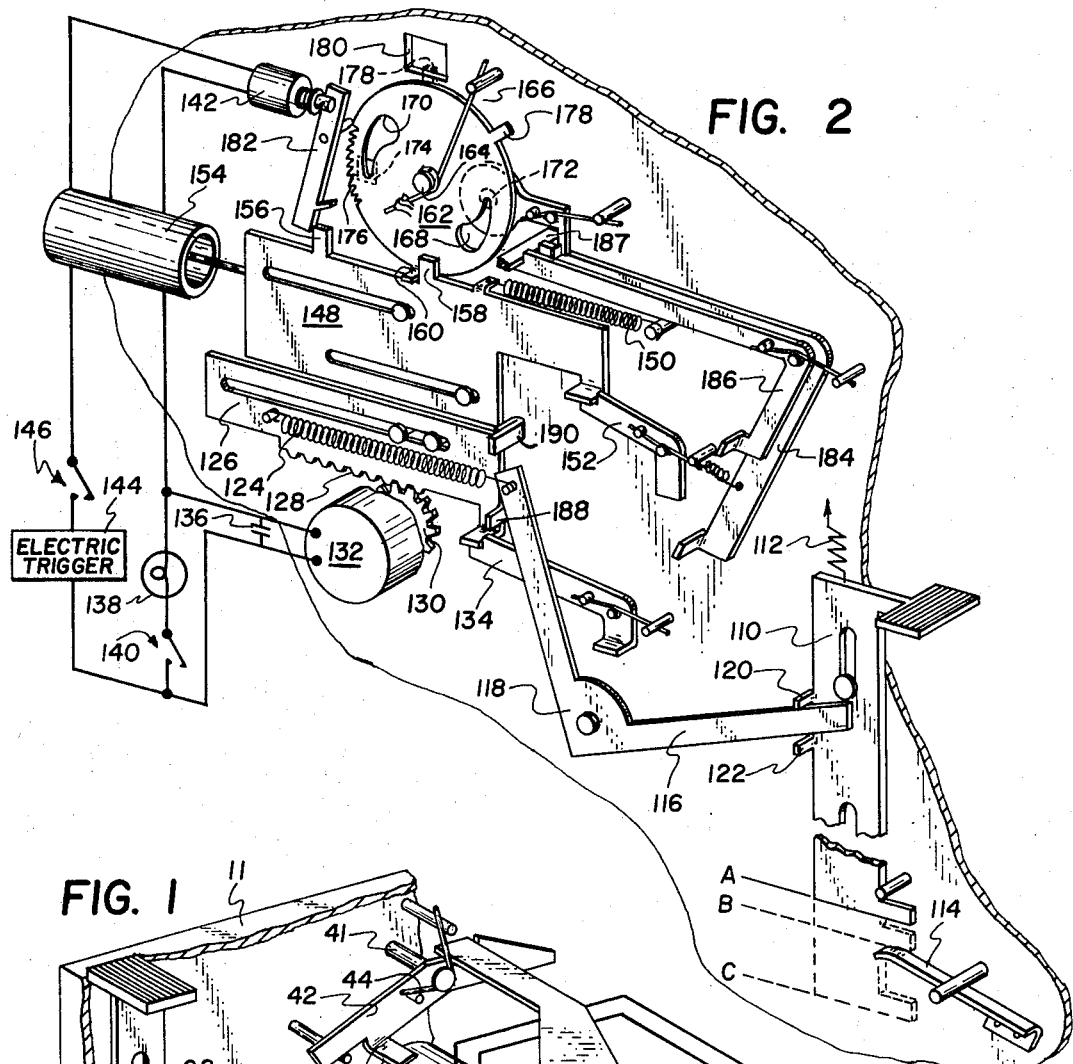
FIG. 2 is a schematic view of a second embodiment of the invention.

FIG. 2 shows an embodiment of the present invention which is adapted to provide a low-light signal to indicate insufficient scene brightness, set an exposure control mechanism or fire a flash lamp.

A shutter release slide or lever 110 is mounted for movement between a raised, start position A; a partially depressed, generator trip position B and a fully depressed, shutter trip position C. Release slide 110 is biased upwardly by spring 112 and is provided with a leaf spring 114 which increases the back pressure felt by the operator when the slide reaches its intermediate position B. Release slide 110 carries one leg 116 of a pivotally mounted lever 118 between a pair of lugs 120 and 122. The other leg of lever 118 is attached through spring 124 to a generator drive slide 126. Slide 126 can be considered a drive sector as in FIG. 1 having infinite radius and is provided with teeth 128 which mesh with a pinion 130 of a generator 132. Slide 126 is normally prevented from rightward movement by a latch 134.

Generator 132 is electrically connected to a capacitor 136 in parallel with a flash attachment 138 and a switch 140 associated with the shutter mechanism. For non-flash pictures, a solenoid coil 142 in series with an electronic trigger device 144 are connected across capacitor 136 and would be put into the circuit by closing a switch 146.

A control member 148 is positioned above drive slide 126 and is latched in the position shown against the biasing force of a spring 150 by a pivoted, spring biased lever 152. Movement of control member 148 is retarded by a damping device 154.

A pair of lugs 156 and 158 are carried by control member 148. The second lug, 158, is engaged by a projection 160 on a lens and photocell diaphragm member 162, the diaphragm member being urged in a direction of rotation about pivot 164 by a spring 166. Diaphragm member 162 is provided with a pair of tapered apertures 168 and 170 which overlie lens 172 and photocell 174, respectively, the photocell being part of electronic trigger 144. The periphery of diaphragm member 162 is provided with a plurality of ratchet notches 176 and with a low-light flag 178 which cooperates with a viewfinder 180 in a manner to be described. A diaphragm stop lever 182 is carried adjacent solenoid 142 and ratchet notches 176 and abuts lug 156 on control member 148.

Two levers 184 and 186 have lower legs lying in the paths of the upper leg of lever 118 and control member 148, respectively. The other legs of levers 184 and 186 engage a spring biased shutter drive lever 187.

In the cocked position as shown, spring 124 is only slightly tensioned. As shutter release slide 110 is depressed, lever 118 rotates in a clockwise direction to tension spring 124. During this time, latch 134 prevents generator drive slide 126 from moving. As release slide 110 reaches its position B, lever 118 engages latch 134 to rotate it in a counter-clockwise direction and release drive slide 126 for rightward movement. When generator drive slide 126 has reached the end of its travel, capacitor 136 has been charged with electrical energy by generator 132, and latching lever 152 is rotated by the drive slide to release control member 148. Because of the absence of teeth on the left side of slide 126, the generator armature will continue to rotate due to inertia.

Control member 148 has now been unlatched and moves under the load of spring 150 at a rate controlled by damping device 154. Lens and photocell diaphragm member 162 follows the motion of control member 148 to uncover lens 172 and photocell 174 at predetermined rates. If the light energy falling on photocell 174 from the scene being photographed reaches a predetermined value due to the uncovering of the cell by aperture 170, the electronic trigger 144 switches on solenoid 142 to discharge the remaining energy in capacitor 136. Solenoid 142 then pulls stop lever 182 to the right (lug 156 having been displaced by rightward movement of control member 148) to latch diaphragm member 162 against further movement. This operation correctly sets the exposure for the existing amount of scene brightness.

Control member 148 continues its travel to disengage latch lever 186 from the path of shutter drive lever 187. If shutter release slide 110 has been depressed to position C, latch lever 184 has already been pivoted out of the path of shutter drive lever 187 and the shutter will be tripped. If release slide 110 has only been depressed to position B, the shutter will not trip due its engagement by latch lever 184. In the latter case, the picture may be taken by depressing release slide 110 to position C or the mechanism may be returned to the position shown in FIG. 2 without exposing the film by releasing slide 110.

However, if the scene brightness is below the low-light capacity of the camera, the energy falling on photocell 174 will not reach the predetermined value needed to fire solenoid 142 even at maximum rotation of diaphragm member 162, and stop lever 182 would not be pulled in by the solenoid. Diaphragm member 162 will, therefore, continue to rotate to its limit of travel and low-light flag 178 will appear in viewfinder 180. Alternatively, an indicator light may be substituted for low-light flag 178 with the diaphragm member operating a switch to connect capacitor 136 to the light. Such systems are well known in the art and have not been illustrated. If release slide 110 is not pushed beyond position B, the shutter will not be tripped when control member 148 reaches the end of its travel as explained above. Release slide 110 may then be returned to its starting position A and an exposure will not have been wasted. If the photographer still desires to take the picture, he may do so by pushing shutter release slide 110 to the C position. Means can be provided for coupling switch 140 to release slide 110 during the low-light condition, so that switch 140 is closed upon the latter movement of slide 110 to the C position.

Whenever shutter release slide 110 is released to return to its starting position, the camera apparatus is reset by virtue of lever 118 engaging a lug 188 on generator drive slide 126, thereby pushing the slide to its latched position. A lug 190 on slide 126 then engages control member 148 to return it to its starting position where it is latched by lever 152. Shutter drive lever 187 is not reset by this mechanism and it can be moved to the left by known methods including the film advancing mechanism, the up-stroke of release slide 110 or a shutter cocking lever. Alternatively, means may be provided on control member 148 to pull lever 187 back to the position shown as control member 148 is cocked.

The invention has been described in detail with particular reference to preferred embodiments thereof, but it will be understood that variations and modifications can be effected within the spirit and scope of the invention.

I claim:

1. In a camera having a shutter operatable for making a photographic exposure, a device for driving an electric generator of the type having a stator and a rotor mounted therein for relatively free rotation for a limited duration, said device comprising:
   a. a member movable from an initial position through a path for driving the generator rotor, said movable member including means for drivingly coupling said movable member to said generator rotor during only a first portion of the movement of said member through said path so that said movable member is not coupled to said generator rotor during the second portion of the movement of said member through said path, whereby said generator rotor can continue movement independent of said movable member after said member has moved through said first portion of said path;
   b. releasable means for preventing movement of said member;
   c. means movable from a first position to a second position for operating said shutter and for releasing said movement preventing means, thereby rendering said movable member free to move;
   d. means for transmitting force to said movable member for imparting movement thereto, said force transmitting means being alternatively placeable in a de-energized condition wherein said means is incapable of transmitting said force to said movable member, and an energized condition wherein said means is capable of transmitting said force to said movable member, said force transmitting means assuming said de-energized condition when said releasing means is in said first position; and
   e. means for placing said force transmitting means in said energized condition in response to movement of said releasing means from said first position towards said second position.

2. A device according to claim 1 further comprising means for moving said movable member to said initial position in response to movement of said releasing means to said first position.

3. A camera having a movable shutter and electrically energizable means for facilitating the making of an exposure, said camera comprising:
   a. an electric generator including a rotor mounted for rotation through at least one complete revolution;
   b. a member movable from an initial position through a path
   c. means for drivingly coupling said movable member to said generator rotor during only the first portion of the movement of said member through said path to drive the generator and for decoupling said member and said rotor during the second portion of the movement of said member through said path;
   d. a release lever movable between an initial and a release position;
   e. spring means for biasing said movable member for movement through said path;
   f. a first latch releasably retaining said movable member in said initial position;
   g. means for releasing said first latch in response to movement of said release lever to said release position to release said movable member, thereby allowing said spring means to move said movable member through said path to drive said generator;
   h. means for storing electrical energy produced by said generator prior to the exposure;
   i. a shutter drive lever displaceable between cocked and uncocked positions for moving the shutter and for connecting said energy storage means to the exposure facilitating means;
   j. means biasing said shutter drive lever for displacement from said cocked position to said uncocked position;
   k. a second latch releasably holding said shutter drive lever in said cocked position; and
   l. means disposed for engagement with said movable member during the second portion of the movement of said member through said path for releasing said second latch, whereby said shutter drive lever is displaced to said second uncocked position to substantially simultaneously move the shutter and to cause energization of said exposure facilitating means.

4. A camera as defined in claim 3 wherein said energy storage means comprises:
   a. an electrical capacitor for storing energy produced by said generator;

b. a normally open switch and a flash lamp receptacle connnected in series across said capacitor, said switch being responsive to opening movement of said shutter to connect said flash lamp receptacle to said capacitor.

5. In a camera having a shutter operatable for making a photographic exposure, and an electrically energizable exposure control mechanism including a movable first member for establishing an exposure parameter, means for moving the first member, and means positionable in response to scene illumination for limiting the amount of movement of the first member, the improvement comprising:
  a. an electric generator for energizing the exposure control mechanism;
  b. means movable between first and second positions for driving said generator;
  c. a release lever movable between an initial and a release position for operating the shutter;
  d. spring means interconnecting said generator driving means and said release lever for biassing said generator driving means for movement to said second position;
  e. means releasably restraining said generator driving means in said first position;
  f. means for releasing said restraining means in response to movement of said release lever to said release position to effect the movement of said generator driving means to drive said generator; and
  g. a second member for releasably engaging the first member to prevent movement of the first member, said second member being actuable in response to movement of said generator driving means to said second position to release the first member for movement limited in accordance with the position of said movement limiting member to establish the exposure parameter.

* * * * *